Patented Apr. 7, 1936

2,036,257

UNITED STATES PATENT OFFICE 2,036,257

CELLULOSE DERIVATIVE SOLUTIONS AND PROCESS OF MAKING THE SAME

James Craik, Stevenston, Scotland, assignor to Imperial Chemical Industries Limited, a corporation of Great Britain No Drawing. Application September 7, 1933, Serial No. 688,431. In Great Britain September 29, 1932

10 Claims. (Cl. 260—152)

This invention relates to the manufacture of solutions of cellulose derivatives and their conversion products and more particularly to caustic soda solutions of such derivatives which are ordinarily insoluble therein.

It is known that cellulose derivatives or near conversion products of cellulose can be obtained which in the ordinary way are insoluble in water and incapable of substantially complete solution in dilute aqueous caustic soda but which can be brought into solution in aqueous caustic soda by cooling in some cases for a predetermined time below 0° C. until crystals of ice appear and subsequently allowing the mixtures to warm up to ordinary atmospheric temperatures.

This invention has as an object the provision of a process whereby this freezing step with its attendant disadvantages may be avoided. Another object is the preparation of solutions of the above described cellulose derivatives. A further object is the preparation of shaped materials such as films, threads, and the like from these solutions. Other objects will appear hereinafter.

These objects are accomplished by the following invention wherein these cellulose derivatives are brought into solution in aqueous caustic soda, without the necessity of freezing, at suitable temperature by mixing the cellulose derivative, aqueous caustic soda and the colloid or other dispersing agent soluble in aqueous caustic soda, preferably with high speed stirring.

The colloid or other dispersing agents employed according to this invention comprise alkyl, aryl sulfonates, mineral oil sulfonates, aromatic sulfonic acids, monobenzyl alkaline sulfanilates, sulfite cellulose lye, alkali soluble celluloses, water- and alkali-soluble cellulose derivatives, condensation products of formaldehyde and naphthalene sulfonic acids, sulfonated fish oils, sulfonated fatty oils, gelatin, glue, pastes or solutions of starch and starch-like substances, gums, Turkey red oils, alkylated polynuclear sulfonic acids, etc. In the case of acidic substances the salts thereof may obviously be used provided these salts are soluble in the dilute caustic soda.

Only small quantities of these colloid or other dispersing agents are necessary, for example, of the order of 1% calculated on the solid cellulose body. Larger quantities may be used and in some cases they act as crystallization inhibitors if cooling is carried on below 0° C.

The preferred proportions of caustic soda are 5-10% when a solution of up to 8% concentration of the cellulose body is required, these percentages being by weight. Thus, up to 8 parts of cellulose body may be dispersed in up to 92 parts of 5-10% caustic soda. Approximately 1% of a dispersing agent, based on the cellulose, may be advantageously present. Other proportions both of caustic soda and cellulose derivative may be used in special circumstances.

In carrying out the invention in one form a fine slurry is made by stirring at high speed for about five minutes, a mixture of the cellulose derivative, aqueous caustic soda, and dispersing agent. In some cases even at ordinary temperatures this gives a solution which can be filtered free from fiber and used in the arts, but in general it is advantageous, after allowing the mass to stand for a period of from ½ an hour to 24 hours, to cool it to a lower temperature and again stir until practically dissolved. In this way a very good solution free from fibers is obtained. This is readily filterable and can be used for any of the well known purposes outlined herein. The invention is illustrated but not limited in the following example in which the parts are by weight.

Example 1

6 parts of hydroxyethyl cellulose (glycol ether of cellulose), incapable at ordinary temperature of substantially complete solution in dilute caustic soda of any concentration, made by causing etherification to take place at ordinary temperature between 11 parts of ethylene oxide in the vapor state and 162 parts of cellulose in the form of soda cellulose crumbs, 94 parts of a 6.5 per cent. aqueous solution of sodium hydroxide and 0.06 part of the substance known by the registered trade mark "Perminal" (isopropylated naphthalene sulfonate) are stirred vigorously for five minutes. The mass is allowed to stand in a tightly closed vessel for two hours and is then cooled to $+2°$ C. and stirred at or about this temperature for a further period of 5 minutes. A good solution free from fiber is thus obtained which can be filtered either at low temperature or on regaining room temperature. A film deposited by the action of dilute aqueous acids from such a solution is clear, flexible and has good wet and dry tensile strengths.

Example 2

15 parts of hydroxyethyl cellulose (glycol ether of cellulose), incapable at ordinary temperature of substantially complete solution of dilute caustic soda at any concentration, made by causing etherification to take place without extraneous supply of heat between 20.1 parts of ethylene chlorhydrin and 162 parts of cellulose in the form of soda cellulose crumbs, 235 parts of an 8 per cent. aqueous solution of sodium hydroxide and 0.15 part of the substance known under the registered trade-mark "Perminal" (an isopropylated naphthalene sulfonate) are stirred vigorously for 5 minutes. The mass is allowed to stand in a tightly closed vessel for 2 hours and is then cooled to +2° C. and stirred at or about this temperature for a further period of 5 minutes. A good solution free from fiber is thus obtained which can be filtered either at low temperature or on regaining room temperature. A film deposited by the action of dilute aqueous acids from such a solution is clear, flexible and has good wet and dry tensile strengths.

*Example 3*

100 parts of reaction mass, obtained by causing etherification to take place without extraneous supply of heat between 11 parts of ethylene oxide in the vapor state and 162 parts of cellulose in the form of soda cellulose crumbs, containing approximately 35% of glycol cellulose, 15% of sodium hydroxide, 1% of sodium carbonate as an incidental ingredient and 49% of water, are suspended in a caustic soda solution containing 38.2 parts of sodium hydroxide, 562.8 parts of water and 0.35 part of the substance known by the registered trade-mark "Perminal' (an isopropylated naphthalene sulfonate) and stirred vigorously for 5 minutes. The mass is allowed to stand in a tightly closed vessel for 2 hours and is then cooled to +2° C. and stirred at or about this temperature for a further period of 5 minutes. A good solution free from fibre is thus obtained which can be filtered either at low temperature or on regaining room temperature. A film deposited by the action of dilute aqueous acids from such a solution is clear, flexible and has good wet and dry tensile strengths.

*Example 4*

Methyl cellulose, incapable at ordinary temperature of substantially complete solution in any concentration of soda, is prepared by the method disclosed in British application No. 8,280 of 1933, for example as follows:

216 parts of air-dry α-wood boards containing 8 per cent of moisture, are shredded in a Werner Pfleiderer or other suitable incorporator for 24 hours with 388 parts of 20% caustic soda. The alkali cellulose so obtained is kept at about 20° C. for 18 hours and is then cooled to a temperature between 0° and 5° C., either in the above incorporator or other suitable vessel fitted with an agitator. 80 parts of dimethyl sulfate are slowly added over a period of about 30-45 minutes stirring being continued throughout the addition and the temperature being maintained at 4-6° C. Mixing is continued for a further period of 2½ hours.

At the end of this time the product is isolated by acidification with 2% sulfuric acid or simply extracted with water. After thorough washing, and drying if desired, it can be stored. 50 parts of this methyl cellulose, 950 parts of a 10% sodium hydroxide solution, and 0.5 part of the substance known by registered trade-mark 'Perminal" (an isopropylated naphthalene sulfonic acid) are stirred vigorously for 5 minutes.

The mass is allowed to stand in a tightly closed vessel for 2 hours and is then cooled to 2° C. and stirred at or about this temperature for a further period of 5 minutes. A good solution almost free from fiber is thus obtained which can be filtered either at low temperature or on regaining room temperature. A film deposited by the action of dilute aqueous acids from such a solution is clear, flexible, and has good wet and dry tensile strengths.

The process of the present invention is applicable generally to cellulose derivatives insoluble in water and in dilute caustic soda at room temperatures but soluble in dilute caustic soda by freezing the same and allowing the mixture to warm to room temperatures. Suitable cellulose derivatives are the low substituted methyl, ethyl, hydroxyethyl, hydroxybenzyl, and dihydroxypropyl ethers of cellulose, cellulose glycollic acid, cellulose oxybutyric acid, cellulose oxyvaleric acid, etc.

Derivatives containing up to 1 substituent per glucose unit of the cellulose molecule may be used, although those derivatives containing approximately 1 substituent per 4 glucose units are preferred.

This invention is of particular application to hydroxyalkyl and particularly hydroxyethyl ethers of cellulose containing low percentages of hydroxyalkyl groups, which are insoluble in water and have hitherto only been substantially completely dissolved in caustic soda by cooling until crystallization occurs and thereafter allowing the mass to warm up to room temperature.

Temperatures of plus 1 to plus 3 degrees C are particularly suitable for the preparation of solutions according to the process of the present invention. The invention is, however, not limited to these temperatures, good solutions being obtainable at higher temperatures. Lower temperatures can also be employed. At these lower temperatures certain of the colloids of the present invention act as crystallization inhibitors.

Solutions made according to the process of the present invention preferably after filtration from slight amounts of undissolved material may be used for the manufacture of films, artificial threads, artificial horsehair, cloth fillings, textile finishes, and the like.

As many apparently widely different embodiments of this invention may be made without departing from the spirit and scope thereof, it is to be understood that I do not limit myself to the specific embodiments thereof except as defined in the appended claims.

I claim:

1. Process for increasing the solubility of cellulose ethers having up to one ether group per glucose unit of the molecule which are insoluble in water and incapable of complete solution in dilute aqueous caustic soda at ordinary temperatures, but which can be brought into solution in aqueous caustic soda by cooling below 0° C. until crystals of ice appear, and subsequently allowing the mixture to warm to atmospheric temperature, which comprises agitating the cellulose ether with aqueous caustic soda and a dispersing agent at a low temperature.

2. A solution in dilute aqueous caustic soda of a cellulose ether having up to one ether group per glucose unit of the molecule which is insoluble in water and incapable of complete solution in dilute aqueous caustic soda at ordinary temperature, but which can be brought into solution in aqueous caustic soda by cooling below 0° C. until crystals of ice appear, and subsequently allowing the mixture to warm to atmospheric temperature, said solution being obtained by agitating the cellulose ether with aqueous caustic soda and a dispersing agent at a low temperature.

3. A cellulose structure prepared by coagulating the solution of claim 2.

4. Process of claim 1 wherein the dispersing agent is a water and alkali soluble colloid.

5. Process for increasing the solubility of hydroxyalkyl derivatives of cellulose having up to one hydroxyalkyl radical per glucose unit of the cellulose which are insoluble in water and incapable of complete solution in dilute aqueous caustic soda solutions but capable of solution in aqueous caustic soda by cooling below 0° C. until crystals of ice appear, and subsequently allowing the mixture to warm to atmospheric temperature, which comprises agitating the hydroxyalkyl ether of cellulose with 5–10% aqueous caustic soda and a dispersing agent at a temperature of from 1° to 3° C.

6. Process for increasing the solubility of hydroxyethyl derivatives of cellulose having up to one hydroxyethyl radical per glucose unit of the cellulose which are insoluble in water and incapable of complete solution in dilute aqueous caustic soda solutions but capable of solution in aqueous caustic soda by cooling below 0° C. until crystals of ice appear, and subsequently allowing the mixture to warm to atmospheric temperature, which comprises agitating the hydroxyethyl ether of cellulose with 5–10% aqueous caustic soda and a dispersing agent at a temperature of from 1° to 3° C.

7. Process for increasing the solubility of hydroxyethyl derivatives of cellulose having up to one hydroxyethyl radical per glucose unit of the cellulose which are insoluble in water and incapable of complete solution in dilute aqueous caustic soda at ordinary temperatures but capable of solution in aqueous caustic soda by cooling at 0° C. until crystals of ice appear, and subsequently allowing the mixture to warm to atmospheric temperature, which comprises agitating up to 8 parts of the hydroxyethyl ether of cellulose with up to 92 parts of a 5–10% sodium hydroxide solution in the presence of a dispersing agent at a temperature of from 1° to 3° C.

8. Process for increasing the solubility of hydroxyethyl derivatives of cellulose having up to one hydroxyethyl radical per glucose unit of the cellulose which are insoluble in water and incapable of complete solution in dilute aqueous caustic soda at ordinary temperatures but capable of solution in aqueous solution of caustic soda by cooling at 0° C. until crystals of ice appear, and subsequently allowing the mixture to warm to atmospheric temperature, which comprises agitating up to 8 parts of the hydroxyethyl ether of cellulose with up to 92 parts of a 5–10% sodium hydroxide solution in the presence of approximately 1% of dispersing agent based on the weight of the cellulose derivative at a temperature of from 1° to 3° C.

9. Process of claim 8 wherein the dispersing agent is an alkylated polynuclear sulfonic acid.

10. Process for increasing the solubility of hydroxyethyl derivatives of cellulose having up to one hydroxyethyl radical per glucose unit for the cellulose which are insoluble in water and incapable of complete solution in dilute aqueous caustic soda at ordinary temperatures but capable of solution in aqueous solution of caustic soda by cooling at 0° C. until crystals of ice appear, and subsequently allowing the mixture to warm to atmospheric temperature, which comprises agitating 6 parts of the hydroxyethyl ether of cellulose with 94 parts of 6.5% aqueous caustic soda solution in the presence of .06 part of isopropylated naphthalene sulfonate based on the weight of the cellulose derivative at a temperature of 2° C.

JAMES CRAIK.